June 6, 1950 G. G. BRUCK ET AL 2,510,461
MULTISTATION MICROWAVE COMMUNICATION SYSTEM
Filed April 9, 1946
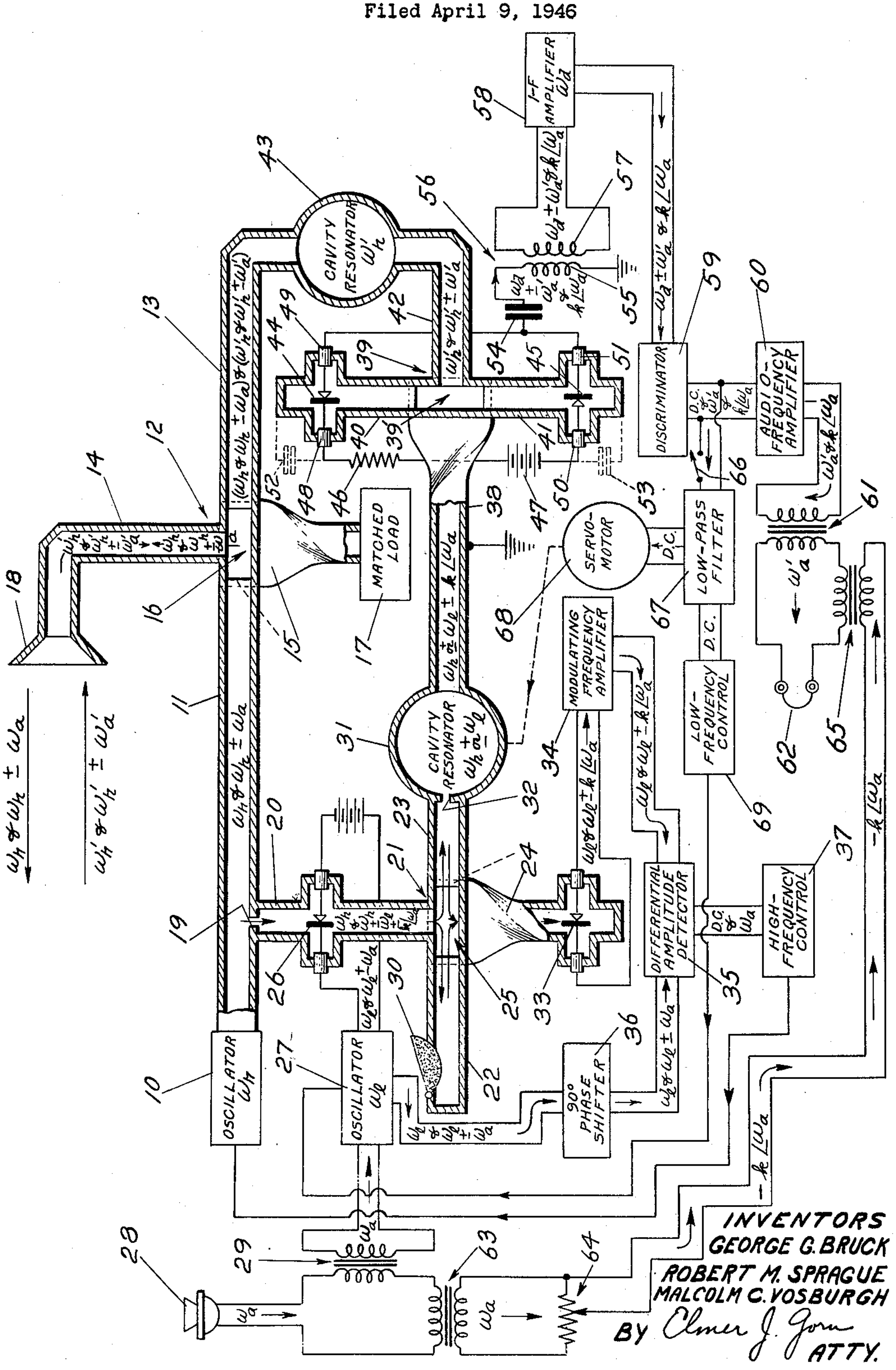
INVENTORS
GEORGE G. BRUCK
ROBERT M. SPRAGUE
MALCOLM C. VOSBURGH
BY Elmer J. Gorn
ATTY.

Patented June 6, 1950 2,510,461

UNITED STATES PATENT OFFICE 2,510,461

MULTISTATION MICROWAVE COMMUNICATION SYSTEM

George G. Bruck, East Orange, N. J., Robert M. Sprague, Waban, Mass., and Malcolm C. Vosburgh, New York, N. Y., assignors to Raytheon Manufacturing Company, Newton, Mass., a corporation of Delaware Application April 9, 1946, Serial No. 660,596

14 Claims. (Cl. 250—13)

This invention relates to radio communication systems, and more particularly to the terminal stations of a frequency-modulated radio communication system comprising, for example, two widely separated terminal stations and a plurality of intermediate relay stations, all operating on different mean carrier frequencies, the system permitting two-way transmission of intelligence between any and all of the stations included therein, with the carrier wave emanating from one of the terminal stations and from each intermediate relay station, hereinafter referred to as the slave stations, under the control of the carrier wave received at each such station, and all under the control of the carrier wave originating at the remaining terminal station, hereinafter referred to as the master station.

A communication system having the foregoing characteristics is disclosed in the copending application of George G. Bruck, Philip E. Volz, Paul J. Pontecorvo and Malcolm C. Vosburgh, entitled Radio communication systems, Ser. No. 650,716, filed February 27, 1946, now Patent No. 2,475,474, issued July 5, 1949. However, for certain purposes, said system is inadequate. For example, it cannot be used for simultaneous two-way transmission because its transmitting and receiving channels are not isolated from each other, as a result of which any intelligence originating at any given station in the system is heard at that same station. Obviously, if said station is receiving intelligence at the same time that it is being used for transmission, the incoming and outgoing signals mix, and both become unintelligible.

It is, therefore, the main object of the present invention to provide a communication system of the type above referred to in which the transmitting and receiving channels of each station are so divorced from each other as to permit their simultaneous use without interference.

This, and other objects of the present invention, which will become more apparent as the detailed description thereof progresses, are attained, briefly, in the following manner:

Throughout the remainder of this specification it will be assumed that the system comprises merely two widely separated terminal stations, with no intermediate relay stations, and with one of said terminal stations functioning as a master, and the other as a slave. It is to be understood, however, that it is preferred that both terminal stations be so constructed as to be operable, at will, as either a master or a slave station.

At the master station, to a description of which this specification will be limited for the time being, a carrier wave, having a frequency, for example, of 10,000 mc./sec., is generated. There is also generated at said master station a sub-carrier wave having a frequency, for example, of 50 mc./sec. Said sub-carrier wave is adapted to be frequency modulated in accordance with local intelligence, and the resulting modulated sub-carrier wave is mixed with a portion of the locally-generated carrier wave to transfer thereto said local intelligence.

The output of the mixer, neglecting any intelligence for the moment, includes the carrier wave, the usual upper sideband wave consisting of the carrier wave plus the sub-carrier wave, and the usual lower sideband wave consisting of the carrier wave minus the sub-carrier wave.

All of these waves are applied to an energy-transmission system designed to divide each into oppositely-phased constituent waves of equal amplitudes. Said constituent waves are caused to suffer reflection by devices, one of which is tuned to the frequency of one or the other of said sideband waves, having such relative reflection coefficients that, upon recombination of the reflected, unattenuated portions thereof, a zero output results, provided said sideband waves have not deviated from their original frequencies. If there has been a deviation, a residual sub-carrier wave is recovered, said residual sub-carrier wave having an amplitude which is a function of the magnitude of said deviation, and having a phase, relative to that of the initially applied sub-carrier wave, which is a function of the sense of said deviation.

The residual sub-carrier wave so recovered is combined with a suitably phase-shifted portion of the initially applied sub-carrier wave to derive therefrom a unidirectional output whose amplitude and sense are functions, respectively, of the magnitude and sense of said frequency deviation.

Said unidirectional output is applied to appropriate means for altering the frequency of the locally-generated carrier wave to compensate for said frequency deviation. In the absence of locally-generated intelligence, said unidirectional output is developed merely as a result of random drift in the frequency of the locally-generated carrier wave, and serves to stabilize the carrier-wave generator. However, said unidirectional output also varies in response to any locally-generated intelligence, and its application to the carrier-wave generator, therefore, serves, also, to frequency modulate said generator, the resulting frequency-modulated carrier wave being radiated into space.

In earlier portions of this specification, it was stated that one of the devices utilized to reflect the constituent waves derived from the locally-generated carrier and sideband waves was tuned to the frequency of one of said sideband waves. Now, said device is so designed as to transmit therethrough some of the energy of the particular sideband wave to which it is tuned, and this transmitted energy serves as local-oscillator energy for the heterodyne reception of any signal coming into the station.

The incoming carrier wave, which may or may not include remotely-generated intelligence, is applied to a high-Q circuit, tuned to the frequency of said incoming carrier wave, to reduce to a minimum, extraneous signals. The output of this circuit, and the transmitted local sideband wave above referred to, are combined to derive from one, constituent waves of opposite phase, and from the other, constituent waves of like phase. All of these constituent waves are then combined to derive therefrom an intermediate-frequency wave whose mean frequency is an arithmetic function of the frequencies of the incoming carrier wave and the local sideband wave producing the same.

Said intermediate-frequency wave is demodulated to extract therefrom any remotely-generated intelligence contained therein and inasmuch as the local sideband wave utilized in the production of said intermediate-freqnency wave may have included local intelligence, means are provided to remove the latter.

At the slave station, the equipment thus far described is duplicated, except that the locally-generated carrier wave, preferably, is of a different frequency than that generated at the master station. The station slave carrier wave may have a frequency, for example, of 10,010 mc./sec. Also, if the tuned reflecting device of the master station is resonant to the upper sideband wave generated thereat, it is preferred that, at the slave station, said tuned reflecting device be resonant to the lower sideband wave.

Now, at the slave station, as at the master station, the carrier wave is locally frequency stabilized. In order, however, that the mean frequency of the intermediate-frequency wave derived at said slave station be maintained at a predetermined constant, it is necessary that the frequency of the locally-generated carrier wave be locked in with the frequency of the carrier wave generated at the master station. If the frequency of the carrier wave generated at the slave station is, in the first instance, improper, the sideband wave entering into the production of the slave station intermediate-frequency wave will be such that the demodulation of said intermediate-frequency wave will yield, in addition to the intelligence contained therein, a unidirectional component whose amplitude and sense depend, respectively, on the magnitude and sense of the deviation of the mean frequency of said intermediate-frequency wave from its correct mean frequency. This unidirectional component is separated from the intelligence recovered from the intermediate-frequency wave, and is applied to means for altering the resonant frequency of the tuned reflecting or sideband-transmitting device of the slave station until the resonant frequency of the latter is such that the mixing of its output with the carrier wave received from the master station produces the correct intermediate-frequency wave.

However, altering the resonant frequency of the slave station sideband-transmitting device changes the amplitude of the sideband wave reflected thereby, and this, in turn, produces a residual sub-carrier wave, as explained above in the description of the master station, which so retunes the slave station carrier-wave generator that, when the local carrier wave is combined with the local sub-carrier wave, one of the resulting sideband waves has a frequency corresponding to the altered resonant frequency of said sideband-transmitting device.

In order to prevent hunting, a portion of the unidirectional component, utilized, as above, to retune the sideband-transmitting device, is also applied to the sub-carrier wave generator to alter its frequency in opposite sense to the alteration of the frequency of the carrier-wave generator.

While it is preferred that the master station include the additional equipment just described, the unidirectional component resulting from the demodulation of the remotely-generated carrier wave received at said master station is not fed back to the local frequency controlling apparatus.

In the accompanying specification there shall be described, and in the annexed drawing shown, an illustrative embodiment of the terminal station of the present invention. It is, however, to be clearly understood that the present invention is not to be limited to the details herein shown and described for purposes of illustration only, inasmuch as changes therein may be made without the exercise of invention, and within the true spirit and scope of the claims hereto appended.

In said drawing, the single figure is a partial block, partial schematic diagram of a terminal station assembled in accordance with the principles of the present invention.

Referring now more in detail to the aforesaid illustrative embodiment of the present invention, with particular reference to the drawing illustrating the same, the numeral 10 designates an oscillator for generating a carrier wave $\omega_h$, preferably, in the microwave region of the electromagnetic spectrum, having a frequency, for example, of 10,000 mc./sec. The output of the oscillator 10 is applied to the side branch 11 of a wave-guide assembly 12, known as a "magic T," said assembly including, in addition to the side branch 11, another side branch 13 collinear with said first side branch, a so-called "E" arm 14 extending at right angles to said side branches 11 and 12, and a so-called "H" arm 15 extending at right angles to both said side branches and said "E" arm, said side branches and said "E" and "H" arms extending from a common junction 16. As shown in the drawing, the "H" arm 15 recedes from the observer for a short distance from the junction 16, then bends downwardly, and is then twisted through an angle of 90°.

As the energy travelling along the side branch 11 from the oscillator 10 reaches the common junction 16, it splits, part travelling along the "H" arm 15 to a matched load 17 which absorbs the same, part leaking across the "T" and travelling along the side branch 13, and part travelling along the "E" arm 14 to an electromagnetic horn 18 adapted to directionally radiate the same. The horn 18 is also receptive, in the opposite direction, of a remotely-generated carrier wave $\omega'_h$, which may be frequency modulated with intelligence $\omega'_a$, and which emanates from another terminal station. As already indicated, the carrier wave $\omega'_h$ may have a frequency of 10,010 mc./sec.

A portion of the carrier wave $\omega_h$ travelling down the side branch 11 of the "magic T" 12 is diverted, through an iris 19, into the "E" arm 20 of another "magic T" 21 which also includes side branches 22 and 23 and an "H" arm 24, all extending from a common junction 25.

The "E" arm 20 has a non-linear impedance, for example, a crystal 26, disposed therein to which there is applied the output of an oscillator 27 adapted to generate a sub-carrier wave $\omega_l$ having a frequency, for example, of 50 mc./sec. The oscillator 27 is adapted to be frequency modulated in accordance with local intelligence $\omega_a$ applied thereto through a microphone 28 and an audio-frequency transformer 29, so that the crystal 26, in addition to its being excited by the carrier wave $\omega_h$, is also excited by the sub-carrier wave $\omega_l$, and sideband waves $\omega_l \pm \omega_a$. Therefore, there travels down the "E" arm 20, toward the junction 25, a carrier wave $\omega_h$, and sideband waves $$\omega_h \pm \omega_l \pm k/\omega_a$$

where $k/\omega_a$ represents local intelligence of small amplitude resulting from initially applying said local intelligence to the oscillator 27 in such phase, with respect to the phase of the intelligence incorporated in the carrier wave which is radiated, as to oppose the latter.

At the junction 25, each of the carrier and sideband waves just referred to split into constituent waves of opposite phase, the constituent waves of one phase travelling along the side branch 22, and those of the opposite phase travelling along the side branch 23. The side branch 22 is terminated by an adjustable attenuating device 30, and the side branch 23 is terminated by a high-Q resonant circuit, such as a cavity resonator 31 provided with an iris 32 through which energy may enter the same. Said cavity resonator 31 is tuned to one of the sideband waves produced as a result of mixing the outputs of the oscillators 10 and 27, and for the purpose of this description, it will be assumed that said cavity resonator is tuned to the upper sideband wave $\omega_h + \omega_l$.

The constituent waves incident upon the attenuating device 30 and the cavity resonator 31 become partially absorbed and partially reflected, and said attenuating device and cavity resonator are designed, respectively, to have such relative reflection coefficients that, when the reflected portions of said constituent waves are subsequently recombined in a non-linear device, as will hereinafter be more fully described, a zero output results, provided the frequency of the incident upper sideband wave corresponds to the frequency to which the cavity resonator 31 is tuned.

By way of illustration, assume $\Gamma_o$ to be the reflection coefficient of the attenuating device 30, and $-1$ to be the reflection coefficient of the cavity resonator 31 with respect to waves having frequencies off resonance. Then, at the junction 25 of the "magic T" 21, the combined reflected portions of the constituent waves of the carrier $\omega_h$ will have the form: $(\Gamma_o+1)\cos \omega_h t$, and the combined reflected portions of the constituent waves of the lower sideband $\omega_h - \omega_l$ will have the form: $(\Gamma_o+1)\cos(\omega_h-\omega_l)t$. When the recombined carrier and lower sideband waves are mixed, as already indicated, a residual sub-carrier or modulation wave will result having the form: $(\Gamma_o+1)^2 \cos \omega_l t$.

Now assume that the reflection coefficient of the cavity resonator 31 at resonance is $\Gamma_c$. Then, at the junction 25 of the "magic T" 21, the reflected portions of the constituent waves of the upper sideband $\omega_h+\omega_l$ will have the form: $(\Gamma_o-\Gamma_c)\cos(\omega_h+\omega_l)t$, and when this recombined wave is mixed with the recombined carrier wave, a residual sub-carrier or modulation wave will result having the form: $(\Gamma_o+1)(\Gamma_o-\Gamma_c)\cos \omega_l t$.

It has been stated that, for the resonance condition, that is, for the condition where the frequency of one of the sideband waves resulting from the combination of the outputs of the oscillators 10 and 27 corresponds to the frequency to which the cavity resonator 31 is tuned, it is desired that the recombination of the reflected portions of all of the constituent waves produce a zero output. In other words, and considering only the amplitude factors of the waves involved, it is desired that $(\Gamma_o+1)^2+(\Gamma_o+1)(\Gamma_o-\Gamma_c)=0$. This condition is satisfied when $\Gamma_o=\frac{1}{2}(\Gamma_c-1)$. Hence, the attenuating device 30 and the cavity resonator 31 are designed in accordance with the last-stated equation.

The combination of the reflected portions of the carrier and sideband constituent waves is effected across a non-linear impedance, for example, a crystal 33, disposed in the "H" arm 24 of the "magic T" 21.

Thus, in the absence of any deviation of the frequency of the upper sideband wave $\omega_h+\omega_l$ from the resonant frequency of the cavity resonator 31, no output appears across the crystal 33. In the event, however, there is deviation, brought about either by random drift in the frequency of the oscillator 10, or locally applied intelligence, a residual sub-carrier or modulation wave is recovered across the crystal 33, the wave so recovered having an amplitude proportional to the magnitude of said frequency deviation, and a phase, relative to the phase of the initially applied sub-carrier wave $\omega_l$, which is a function of the sense of said frequency deviation.

The output of the crystal 33 is applied, through a broadband amplifier 34, whose center frequency corresponds to the frequency of the sub-carrier wave $\omega_l$, to a differential-amplitude detector 35 to derive a unidirectional output having an amplitude and sense depending, respectively, on the magnitude and sense of the above referred to frequency deviations. The differential-amplitude detector 35 may be of the type described in detail in the copending application of George G. Bruck and Philip E. Volz, entitled Frequency-stabilizing system, Ser. No. 647,008, filed February 12, 1946, now Patent No. 2,486,001, dated October 25, 1949, and is receptive, together with the output from the amplifier 34, of a portion of the initially applied sub-carrier wave $\omega_l$ from the oscillator 27, the latter being phase shifted 90° by any suitable phase shifter 36. The residual sub-carrier wave recovered across the crystal 33 leads or lags the initially applied sub-carrier wave by 90°, depending upon the direction of the frequency deviation which brought it into being. Therefore, said residual sub-carrier wave is either in phase with the output of the phase shifter 36, or it is in phase opposition thereto.

The unidirectional output of the differential-amplitude detector is applied, through any appropriate control device 37, to the oscillator 10 to alter the frequency of the carrier wave $\omega_h$ in response to the deviations heretofore referred to. If said deviations are merely random, they are compensated for, thereby stabilizing the frequency of the carrier wave, and if said deviations are the result of locally-generated intelligence, they cause the carrier wave which is radiated to be frequency modulated in accordance with said intelligence.

Now the cavity resonator 31, in addition to communicating with the side branch 23 of the "magic T" 21 through the iris 32, also communicates with the "H" arm 38 of a third "magic T" 39 which includes side branches 40 and 41 and an "E" arm 42, all extending from a common junction 39'. This "magic T" functions as a mixer, as described in detail in the copending application of George G. Bruck, entitled Mixing apparatus, Ser. No. 652,628, filed March 7, 1946, now Patent No. 2,468,166, dated April 26, 1949, to combine a local, fixed-frequency wave, namely, a portion of the sideband wave $\omega_h+\omega_l$ transmitted by the cavity resonator 31 with an incoming carrier wave $\omega'_h$, remotely generated at a slave station, to derive an intermediate-frequency wave $\omega_d$ whose mean frequency is an arithmetic function of the frequencies of said sideband and incoming carrier waves, preferably, the difference therebetween.

The "E" arm 42 communicates with an energy-transmitting cavity resonator 43 which is receptive, from the side branch 13 of the "magic T" 12, of the incoming carrier wave $\omega'_h$, which may or may not include remotely-generated intelligence $\omega'_a$, and that portion of the locally-generated carrier wave $\omega_h$ leaking across the "T" of said "magic T" 12. The cavity resonator 43 is tuned to the remotely-generated carrier wave $\omega'_h$ so that energy of any other frequencies is greatly attenuated thereby.

The side branches 40 and 41 are terminated, respectively, by non-linear impedances, for example, crystals 44 and 45, said crystals being oppositely disposed with respect to each other, and connected in series through a resistor 46 and a source 47 of direct current. The conductors connecting said crystals pass through insulators 48 to 51, inclusive, the insulators 48 and 50 being of such construction (not specifically shown) as to present capacitances 52 and 53 between one side of each of said crystals and the wave-guide system itself, the latter being grounded as shown. The crystals 44 and 45 are further connected to provide parallel outputs to ground through a capacitor 54 and the primary winding 55 of an output transformer 56 having a secondary winding 57. The source 47 of direct current is for the purpose of operating the crystals 44 and 45 at favorable points along their characteristic curves, and the series circuit is for the purpose of passing equal currents through said crystals to assure their similar action even though both be mismatched to the wave-guide system.

Assume, for the moment, that the electric vector of the remotely-generated carrier wave $\omega'_h$, travelling along the "E" arm 42 toward the common junction 39', is pointing upwardly, and further assume that the electric vector of the locally-produced sideband wave $\omega_h+\omega_l$, travelling along the "H" arm 38 toward the common junction 39', is pointing to the right at said junction 39'. When the former reaches the junction 39', it splits into two constituent waves, one, having its electric vector pointing to the right, travelling along the side branch 40 toward the crystal 44, and the other, having its electric vector pointing to the left, travelling along the side branch 41 toward the crystal 45. When the latter reaches the junction 39', it, too, splits into two constituent waves, one travelling toward the crystal 44 and the other travelling toward the crystal 45, with both having their electric vectors pointing in the same direction, namely, to the right. Thus, there arrives at the crystal 44 two constituent carrier waves which are in phase, and there arrives at the crystal 45 two constituent carrier waves which are out of phase. Therefore, there is produced at the crystal 44, a beat-frequency waves, and whose phase may be considered posiference between the frequencies of its component waves, and whose phase may be considered positive because its component waves are in phase; while at the crystal 45, there is produced a beat-frequency wave having the same frequency as said first-named beat-frequency wave, and having a phase which may be considered negative because its component waves are out of phase. However, as to each other, the two beat-frequency waves thus obtained are in phase, and set up equal voltages of like polarity across the crystals. Inasmuch as parallel outputs are taken from these crystals, addition occurs, and a constant-amplitude, intermediate-frequency wave $\omega_d$ appears across the primary winding 55 of the transformer 56.

Through the secondary winding 57 of the transformer 56, this intermediate-frequency wave $\omega_d$, together with any remotely-generated intelligence $\omega'_a$, and any small amount of locally-generated intelligence $\omega_a$ which may have been contained in the locally-produced sideband wave $\omega_h+\omega_l$, is applied to a broadband intermediate-frequency amplifier 58 whose center frequency corresponds to the difference $\omega_d$ between the frequencies of the component waves producing the same. The output of the amplifier 58, consisting of the difference frequency $\omega_d$ and any intelligence $\omega_a$ and $\omega'_a$ originating, respectively, at the master and slave stations, is applied to a frequency discriminator 59 whose center frequency, likewise, corresponds to said difference frequency $\omega_d$. The discriminator extracts any intelligence included in the intermediate-frequency input applied thereto, which intelligence is then conveyed, through an audio-frequency amplifier 60, and an audio-frequency transformer 61, to phones 62 or any automatic recording instrument. In order to remove any locally-generated intelligence $\omega_a$ from the input to the phones 62, a small amount of said locally-generated intelligence $\omega_a$ may be applied, through a transformer 63 and a potentiometer 64, to a transformer 65 so connected into the output circuit of the station as to oppose the locally-generated intelligence applied thereto through the transformer 61.

Thus, at the master station, a frequency-stabilized carrier wave $\omega_h$ containing locally-generated intelligence $\omega_a$ is produced, and any remotely-generated intelligence $\omega'_a$ contained in an incoming carrier wave $\omega'_h$ received at said station is so prevented from mixing with said locally-generated intelligence as to enable the transmitting and receiving channels of the station to be utilized simultaneously.

Now, at the slave station, it is desired to lock in the locally-generated carrier wave $\omega'_h$ with the master station carrier wave $\omega_h$. For this purpose, the output of the discriminator 59 is applied, through a switch 66, to a low-pass filter 67 which blocks any intelligence contained in said output, but passes the unidirectional component thereof. If the slave station carrier wave $\omega'_h$ is of the correct mean frequency to begin with, the mean frequency of the intermediate-frequency wave $\omega'_d$ developed at said slave station will be such that there will be no unidirectional component coming from the discriminator 59, but should the mean frequency of said locally-generated carrier wave be incorrect, there will be such a component, and the magnitude and sense thereof will be functions, respectively, of the magnitude and sense of the deviation of the mean frequency of said locally-generated carrier wave from its correct mean frequency.

In order to compensate for such a deviation, the output of the filter 67 is utilized to drive a servo-motor 68, mechanically connected, as shown by the broken line, to the local cavity resonator 31, to retune the latter until its resonant frequency $\omega'_h-\omega'_1$ is such that when the sideband wave transmitted by said cavity resonator to the local mixer 39 is combined with the incoming master station carrier wave $\omega_h$, the mean frequency of the intermediate-frequency wave $\omega'_d$ will be such that it includes no unidirectional component.

As the slave station cavity resonator 31 is being so retuned, an output will be developed across the local crystal 33 for the reasons explained above in connection with the description of the master station, and said output will cause the local differential-amplitude detector 35 to also develop an output. The latter, being fed to the local frequency-control device 37, will alter the mean frequency of the locally-generated carrier wave $\omega'_h$ until the frequency of the lower sideband wave $\omega'_h-\omega'_1$, produced by mixing said carrier wave with the local sub-carrier wave $\omega'_1$, corresponds to the altered resonant frequency of the local cavity resonator 31. Thus, there will always be a fixed relationship between the mean frequencies of the master and slave station carrier waves.

Because the servo-motor 68 will have inertia, hunting must be prevented, and for this purpose, a portion of the output of the filter 67 is applied to any suitable frequency-controlling device 69 for adjusting the frequency of the output of the local oscillator 27, this adjustment being such as to produce a sideband wave which actually halts the output of the discriminator 59 before the motor 68 has tuned the cavity resonator 31 to the correct frequency, the final tuning of said cavity resonator being the result of the coasting, rather than the positive driving, of said motor.

It is to be understood that it is intended that the master station also be provided with a switch 66, filter 67, motor 68 and control device 69, but that at said station, the switch 66 be kept open. Thus, either station can be used as a master or a slave.

This completes the description of the aforesaid illustrative embodiment of the communication systems of the present invention, together with the mode of operation thereof. It will be noted from all of the foregoing that the present invention provides a system, having the characteristics set forth in the opening paragraphs of this specification, and permitting simultaneous transmission and reception at each of the stations therein.

Other objects and advantages of the present invention will readily occur to those skilled in the art to which the same relates.

What is claimed is:

1. Apparatus for frequency stabilizing a carrier wave comprising: means, receptive of said carrier wave, for modulating the same to produce sideband waves; means, receptive of said carrier and sideband waves, for deriving from each, oppositely-phased constituent waves; means receptive of the constituent waves of one of said opposite phases, for partially attenuating and partially reflecting the same; means receptive of the constituent waves of the other of said opposite phases, for partially attenuating and partially reflecting the same; said two last-named means having relative reflection coefficients at the frequency of one of said sideband waves equal, respectively, to $\Gamma_c$ and $\frac{1}{2}(\Gamma_c-1)$; means receptive of the unattenuated, reflected portions of all of said constituent waves, for recombining the same and thereby reconstituting said carrier and sideband waves; means, receptive of said reconstituted carrier and sideband waves, for deriving therefrom oppositely-phased residual modulation waves; said oppositely-phased residual modulation waves being of equal amplitudes if the frequencies of said sideband waves remain constant, and of unequal amplitudes if said frequencies vary; means, receptive of said last-named residual modulation waves, for deriving therefrom a final modulation wave whose amplitude and phase depend, respectively, on the magnitude and sense of any such frequency deviations; means, receptive of said final modulation wave, for deriving therefrom a unidirectional output whose amplitude and sense, likewise, depend, respectively, on the magnitude and sense of said frequency deviations; and means, receptive of said unidirectional output and coupled to the source of said carrier wave, for altering the frequency of said carrier wave in response to said unidirectional output.

2. Apparatus for frequency stabilizing a carrier wave comprising: means, receptive of said carrier wave, for modulating the same to produce sideband waves; a wave guide system including a first main branch, and a pair of auxiliary branches perpendicularly extending in opposite directions from a common junction with said first main branch; said wave guide system being receptive of said carrier and sideband waves for deriving from each, oppositely-phased constituent waves; means, having a reflection coefficient $\Gamma_c$ at the frequency of one of said sideband waves, and being disposed in one of the auxiliary branches of said wave guide system in the paths of the constituent waves of one of said opposite phases, for partially attenuating and partially reflecting the same; means, having a reflection coefficient $\Gamma_o$ equal to $\frac{1}{2}(\Gamma_c-1)$, and being disposed in the other of the auxiliary branches of said wave guide system in the paths of the constituent waves of the other of said opposite phases, for partially attenuating and partially reflecting the same; said wave guide system including a second main branch extending from said common junction, mutually perpendicular to said first main branch and said auxiliary branches, and being receptive of the unattenuated, reflected portions of all of said constituent waves for recombining the same and thereby reconstituting said carrier and sideband waves; means, receptive of said reconstituted carrier and sideband waves, for deriving therefrom oppositely-phased residual modulation waves; said oppositely-phased residual modulation waves being of equal amplitudes if the frequencies of said sideband waves remain constant, and of unequal amplitudes if said frequencies vary; means, receptive of said last-named residual modulation waves, for deriving therefrom a final modulation wave whose amplitude and phase depend, respectively, on the magnitude and sense of any such frequency deviations; means, receptive of said final modulation wave, for deriving therefrom a unidirectional output whose amplitude and sense, likewise, depend, respectively, on the magnitude and sense of said frequency deviations; and means, receptive of said unidirectional output and coupled to the source of said carrier wave, for altering the frequency of said carrier wave in response to said unidirectional output.

3. Apparatus for frequency stabilizing a carrier wave comprising: means, receptive of said carrier wave, for modulating the same to produce side band waves; a wave guide system including a first main branch, and a pair of auxiliary branches perpendicularly extending in opposite directions from a common junction with said first main branch; said wave guide system being receptive of said carrier and sideband waves for deriving from each, oppositely-phased constituent waves; a cavity resonator, tuned to the frequency of one of said sideband waves, having a reflection coefficient $\Gamma_c$ at the frequency of said one of said sideband waves, and being disposed in one of the auxiliary branches of said wave guide system in the paths of the constituent waves of one of said opposite phases, for partially attenuating and partially reflecting the same; a resistive impedance, having a reflection coefficient $\Gamma_o$ equal to $\frac{1}{2}(\Gamma_c-1)$, and being disposed in the other of the auxiliary branches of said wave guide system in the paths of the constituent waves of the other of said opposite phases, for partially attenuating and partially reflecting the same; said wave guide system including a second main branch extending from said common junction, mutually perpendicular to said first main branch and said auxiliary branches, and being receptive of the unattenuated, reflected portions of all of said constituent waves for recombining the same and thereby reconstituting said carrier and sideband waves; means, receptive of said reconstituted carrier and sideband waves, for deriving therefrom oppositely-phased residual modulation waves; said oppositely-phased residual modulation waves being of equal amplitudes if the frequencies of said sideband waves remain constant, and of unequal amplitudes if said frequencies vary; means, receptive of said last-named residual modulation waves, for deriving therefrom a final modulation wave whose amplitude and phase depend, respectively, on the magnitude and sense of any such frequency deviations; means, receptive of said final modulation wave, for deriving therefrom a unidirectional output whose amplitude and sense, likewise, depend, respectively, on the magnitude and sense of said frequency deviations; and means, receptive of said unidirectional output and coupled to the source of said carried wave, for altering the frequency of said carrier wave in response to said unidirectional output.

4. Apparatus for frequency stabilizing a carrier wave comprising: means, receptive of said carrier wave, for modulating the same to produce sideband waves; means, receptive of said carrier and sideband waves, for deriving from each, oppositely-phase constituent waves; means, having a reflection coefficient $\Gamma_c$ at the frequency of one of said sideband waves, and being interposed in the paths of the constituent waves of one of said opposite phases, for partially attenuating and partially reflecting the same; means, having a reflection coefficient $\Gamma_o$ equal to $\frac{1}{2}(\Gamma-1)$, and being interposed in the paths of the constituent waves of the other of said opposite phases, for partially attenuating and partially reflecting the same; means, receptive of the unattenuated, reflected portions of all of said constituent waves, for recombining the same and thereby reconstituting said carrier and sideband waves; means, receptive of said reconstituted carrier and sideband waves, for deriving therefrom oppositely-phased residual modulation waves; said oppositely-phased residual modulation waves being of equal amplitudes if the frequencies of said sideband waves remain constant, and of unequal amplitudes if said frequencies vary; means, receptive of said last-named residual modulation waves, for deriving therefrom a final modulation wave whose amplitude and phase depend, respectively, on the magnitude and sense of any such frequency deviations; a differential amplitude detector, receptive of a portion of the initial modulating energy and said final modulation wave, for deriving therefrom a unidirectional output whose amplitude and sense, likewise, depend, respectively, on the magnitude and sense of said frequency deviations; and means, receptive of said unidirectional output and coupled to the source of said carrier wave, for altering the frequency of said carrier wave in response to said unidirectional output.

5. Apparatus for frequency stabilizing a carrier wave comprising: means, receptive of said carrier wave, for modulating the same to produce sideband waves; a wave guide system including a first main branch, and a pair of auxiliary branches perpendicularly extending in opposite directions from a common junction with said first main branch; said wave guide system being receptive of said carrier and sideband waves for deriving from each, oppositely-phased constituent waves; means, having a reflection coefficient $\Gamma_c$ at the frequency of one of said sideband waves, and being disposed in one of the auxiliary branches of said wave guide system in the paths of the constituent waves of one of said opposite phases, for partially attenuating and partially reflecting the same; means, having a reflection coefficient $\Gamma_o$ equal to $\frac{1}{2}(\Gamma_c-1)$, and being disposed in the other of the auxiliary branches of said wave guide system in the paths of the constituent waves of the other of said opposite phases, for partially attenuating and partially reflecting the same; said wave guide system including a second main branch extending from said common junction, mutually perpendicular to said first main branch and said auxiliary branches, and being receptive of the unattenuated, reflected portions of all of said constituent waves for recombining the same and thereby reconstituting said carrier and sideband waves; means, receptive of said reconstituted carrier and sideband waves, for deriving therefrom oppositely-phased residual modulation waves; said oppositely-phased residual modulation waves being of equal amplitudes if the frequencies of said sideband waves remain constant, and of unequal amplitudes if said frequencies vary; means, receptive of said last-named residual modulation waves, for deriving therefrom a final modulation wave whose amplitude and phase depend, respectively, on the magnitude and sense of any such frequency deviations; a differential amplitude detector, receptive of a portion of the initial modulating energy and said final modulation wave, for deriving therefrom a unidirectional output whose amplitude and sense, likewise, depend, respectively, on the magnitude and sense of said frequency deviations; and means, receptive of said unidirectional output and coupled to the source of said carrier wave, for altering the frequency of said carrier wave in response to said unidirectional output.

6. Apparatus for frequency stabilizing a carrier wave comprising: means, receptive of said carrier wave, for modulating the same to produce sideband waves; a wave guide system including a first main branch, and a pair of auxiliary branches perpendicularly extending in opposite directions from a common junction with said first main branch; said wave guide system being receptive of said carrier and sideband waves for deriving from each, oppositely-phased constituent waves; a cavity resonator, tuned to the frequency of one of said sideband waves, having a reflection coefficient $\Gamma_c$ at the frequency of one of said sideband waves, and being disposed in one of the auxiliary branches of said wave guide system in the paths of the constituent waves of one of said opposite phases, for partially attenuating and partially reflecting the same; means, having a reflection coefficient $\Gamma_o$ equal to $\frac{1}{2}$ ($\Gamma_c$—1), and being disposed in the other of the auxiliary branches of said wave guide system in the paths of the constituent waves of the other of said opposite phases, for partially attenuating and partially reflecting the same; said wave guide system including a second main branch extending from said common junction, mutually perpendicular to said first main branch and said auxiliary branches, and being receptive of the unattenuated, reflected portions of all of said constituent waves for recombining the same and thereby reconstituting said carrier and sideband waves; means, receptive of said reconstituted carrier and sideband waves, for deriving therefrom oppositely-phased residual modulation waves; said oppositely-phased residual modulation waves being of equal amplitudes if the frequencies of said sideband waves remain constant, and of unequal amplitudes if said frequencies vary; means, receptive of said last-named residual modulation waves, for deriving therefrom a final modulation wave whose amplitude and phase depend, respectively, on the magnitude and sense of any such frequency deviations; a differential amplitude detector, receptive of a portion of the initial modulating energy and said final modulation wave, for deriving therefrom a unidirectional output whose amplitude and sense, likewise, depend, respectively, on the magnitude and sense of said frequency deviations; and means, receptive of said unidirectional output and coupled to the source of said carrier wave, for altering the frequency of said carrier wave in response to said unidirectional output.

7. In a terminal station for a radio communication system: means for locally generating a carrier wave; means for locally generating a sub-carrier wave; means, coupled to said last-named means, for modulating said sub-carrier wave in accordance with local intelligence; means, receptive of said carrier and modulated sub-carrier waves, for combining the same to produce sideband waves; means, receptive of said carrier and sideband waves, for deriving from each, oppositely-phased constituent waves; means, having a reflection coefficient $\Gamma_c$ at the frequency of one of said sideband waves, and being interposed in the paths of the constituent waves of one of said opposite phases, for partially attenuating and partially reflecting the same; means, having a reflection coefficient $\Gamma_o$ equal to $\frac{1}{2}$ ($\Gamma_c$—1), and being interposed in the paths of the constituent waves of the other of said opposite phases, for partially attenuating and partially reflecting the same; means, receptive of the unattenuated, reflected portions of all of said constituent waves, for recombining the same and thereby reconstituting said carrier and sideband waves; means, receptive of said reconstituted carrier and sideband waves, for deriving therefrom oppositely-phased residual modulation waves; said oppositely-phased residual modulation waves being of equal amplitudes if the frequencies of said sideband waves remain constant, and of unequal amplitudes if said frequencies vary; means, receptive of said last-named residual modulation waves, for deriving therefrom a final modulation wave whose amplitude and phase depend, respectively, on the magnitude and sense of any such frequency deviations; means, receptive of a portion of the initially modulated sub-carrier wave and said final modulation wave, for deriving therefrom a unidirectional output whose amplitude and sense, likewise, depend, respectively, on the magnitude and sense of said frequency deviations; and means, receptive of said unidirectional output and coupled to the source of said carrier wave, for altering the frequency of said carrier wave in response to said unidirectional output.

8. In a terminal station for a radio communication system: means for locally generating a carrier wave; means for locally generating a sub-carrier wave; means, coupled to said last-named means, for modulating said sub-carrier wave in accordance with local intelligence; means, receptive of said carrier and modulated sub-carrier waves, for combining the same to produce sideband waves; a wave guide system including a first main branch, and a pair of auxiliary branches perpendicularly extending in opposite directions from a common junction with said first main branch; said wave guide system being receptive of said carrier and sideband waves for deriving from each, oppositely-phased constituent waves; means, having a reflection coefficient $\Gamma_c$ at the frequency of one of said sideband waves, and being disposed in one of the auxiliary branches of said wave guide system in the paths of the constituent waves of one of said opposite phases, for partially attenuating and partially reflecting the same; means, having a reflection coefficient $\Gamma_o$ equal to $\frac{1}{2}$ ($\Gamma_c$—1), and being disposed in the other of the auxiliary branches of said wave guide system in the paths of the constituent waves of the other of said opposite phases, for partially attentuating and partially reflecting the same; said wave guide system including a second main branch extending from said common junction, mutually perpendicular to said first main branch and said auxiliary branches, and being receptive of the unattenuated, reflected portions of all of said constituent waves for recombining the same and thereby reconstituting said carrier and sideband waves; means, receptive of said reconstituted carrier and sideband waves, for deriving therefrom oppositely-phased residual modulation waves; said oppositely-phased residual modulation waves being of equal amplitudes if the frequencies of said sideband waves remain constant, and of unequal amplitudes if said frequencies vary; means, receptive of said last-named residual modulation waves, for deriving therefrom a final modulation wave whose amplitude and phase depend, respectively, on the magnitude and sense of any such frequency deviations; means, receptive of a portion of the initially modulated sub-carrier wave and said final modulation wave, for deriving therefrom a unidirectional output whose amplitude and sense, likewise, depend, respectively, on the magnitude and sense of said frequency deviations; and means, receptive of said unidirectional output and coupled to the source of said carrier wave, for altering the frequency of said carrier wave in response to said unidirectional output.

9. In a terminal station for a radio communication system: means for locally generating a carrier wave; means for locally generating a sub-carrier wave; means, coupled to said last-named means, for modulating said sub-carrier wave in accordance with local intelligence; means, receptive of said carrier and modulated sub-carrier waves, for combining the same to produce sideband waves; a wave guide system including a first main branch, and a pair of auxiliary branches perpendicularly extending in opposite directions from a common junction with said first main branch; said wave guide system being receptive of said carrier and sideband waves for deriving from each, oppositely-phased constituent waves; a cavity resonator, tuned to the frequency of one of said sideband waves, having a reflection coefficient $\Gamma_c$ at the frequency of said one of said sideband waves, and being disposed in one of the auxiliary branches of said wave guide system in the paths of the constituent waves of one of said opposite phases, for partially attenuating and partially reflecting the same; a resistive impedance, having a reflection coefficient $\Gamma_o$ equal to $\frac{1}{2}(\Gamma_c-1)$, and being disposed in the other of the auxiliary branches of said wave guide system in the paths of the constituent waves of the other of said opposite phases, for partially attenuating and partially reflecting the same; said wave guide system including a second main branch extending from said common junction, mutually perpendicular to said first main branch and said auxiliary branches, and being receptive of the unattenuated, reflected portions of all of said constituent waves for recombining the same and thereby reconstituting said carrier and sideband waves; means, receptive of said reconstituted carrier and sideband waves, for deriving therefrom oppositely-phased residual modulation waves; said oppositely-phased residual modulation waves being of equal amplitudes if the frequencies of said sideband waves remain constant, and of unequal amplitudes if said frequencies vary; means, receptive of said last-named residual modulation waves, for deriving therefrom a final modulation wave whose amplitude and phase depend, respectively, on the magnitude and sense of any such frequency deviations; means, receptive of a portion of the initially modulated sub-carrier wave and said final modulation wave, for deriving therefrom a unidirectional output whose amplitude and sense, likewise, depend, respectively, on the magnitude and sense of said frequency deviations; and means, receptive of said unidirectional output and coupled to the source of said carrier wave, for altering the frequency of said carrier wave in response to said unidirectional output.

10. In a terminal station for a radio communication system: means for locally generating a carrier wave; means, receptive of said locally-generated carrier wave, for modulating the same to produce upper and lower sideband waves; means, receptive of a portion of said carrier wave and said sideband waves, and coupled back to said means for locally generating said carrier wave, for stabilizing the frequencies of said sideband waves; means for receiving a remotely-generated, frequency-modulated carrier wave; means, receptive of one of said frequency-stabilized sideband waves and said remotely-generated, frequency-modulated carrier wave, for combining the same to produce a frequency-modulated, intermediate-frequency wave whose mean frequency corresponds to the difference between the frequency of said last-named, stabilized sideband wave and the mean frequency of said remotely-generated carrier wave; and means, receptive of said intermediate-frequency wave, for extracting the intelligence contained in the frequency modulation thereof.

11. In a terminal station for a radio communication system: means for locally generating a carrier wave; means for locally generating a sub-carrier wave; means, receptive of said sub-carrier wave, for modulating the same in accordance with local intelligence; means, receptive of said locally-generated carrier wave and said modulated sub-carrier wave, for combining the same to produce upper and lower sideband waves; means, receptive of a portion of said carrier wave and said sideband waves, and coupled back to said means for locally generating said carrier wave, for stabilizing the frequencies of said sideband waves; means for receiving a remotely-generated, frequency-modulated carrier wave; means, receptive of one of said frequency-stabilized sideband waves and said remotely-generated, frequency-modulated carrier wave, for combining the same to produce a frequency-modulated, intermediate-frequency wave whose mean frequency corresponds to the difference between the frequency of said last-named, stabilized sideband wave and the mean frequency of said remotely-generated carrier wave; means, receptive of said intermediate-frequency wave, for extracting the intelligence contained in the frequency modulation thereof; and means, coupled intermediate the source of local intelligence and said last-named means, for removing from the output of the latter the locally-generated portion thereof.

12. In a terminal station for a radio communication system: means for locally generating a carrier wave; means, receptive of said locally-generated carrier wave, for modulating the same to produce upper and lower sideband waves; a wave guide system including a first main branch, and a pair of auxiliary branches perpendicularly extending in opposite directions from a common junction with said first main branch; said wave guide system being receptive of a portion of said carrier wave and said sideband waves for deriving from each, oppositely-phased constituent waves; a cavity resonator, tuned to the frequency of one of said sideband waves, having a reflection coefficient $\Gamma_c$ at the frequency of said one of said sideband waves, and being disposed in one of the auxiliary branches of said wave guide system in the paths of the constituent waves of one of said opposite phases, for partially attenuating and partially reflecting the same; a resistive impedance, having a reflection coefficient $\Gamma_c$ equal to $\frac{1}{2}(\Gamma_c-1)$, and being disposed in the other of the auxiliary branches of said wave guide system in the paths of the constituent waves of the other of said opposite phases, for partially attenuating and partially reflecting the same; said wave guide system including a second main branch extending from said common junction, mutually perpendicular to said first main branch and said auxiliary branches, and being receptive of the unattenuated, reflected portions of all of said constituent waves for recombining the same and thereby reconstituting said carrier and sideband waves; means, receptive of said reconstituted carrier and sideband waves, for deriving therefrom oppositely-phased residual modulation waves; said oppositely-phased residual modulation waves being of equal amplitudes if the frequencies of said sideband waves remain constant, and of unequal amplitudes if said frequencies vary; means, receptive of said last-named residual modulation waves for deriving therefrom a final modulation wave whose amplitude and phase depend, respectively, on the magnitude and sense of any such frequency deviations; means, receptive of said final modulation wave, for deriving therefrom a unidirectional output whose amplitude and sense, likewise, depend, respectively, on the magnitude and sense of said frequency deviations; means receptive of said unidirectional output and coupled to the source of said locally-generated carrier wave, for stabilizing the frequency thereof in response to said unidirectional output; said cavity resonator transmitting therethrough a portion of the sideband wave to which it is resonant and which is incident thereon as aforesaid; means for receiving a remotely-generated, frequency-modulated carrier wave; means, receptive of said resonator-transmitted, frequency-stabilized sideband wave and said remotely-generated, frequency-modulated carrier wave, for combining the same to produce a frequency-modulated, intermediate-frequency wave whose mean frequency corresponds to the difference between the frequency of said last-named, stabilized sideband wave and the mean frequency of said remotely-generated carrier wave; and means, receptive of said intermediate-frequency wave, for extracting the intelligence contained in the frequency modulation thereof.

13. In a terminal station for a radio communication system: means for locally generating a carrier wave; means, receptive of said locally-generated carrier wave, for modulating the same to produce upper and lower sideband waves; means for receiving a remotely-generated, frequency-stabilized carrier wave; means, receptive of one of said sideband waves and said remotely generated, frequency-modulated carrier wave, for combining the same to produce a frequency-modulated, intermediate-frequency wave whose mean frequency is an arithmetic function of the frequencies of said last-named sideband wave and the mean frequency of said remotely-generated carrier wave; means, receptive of said intermediate-frequency wave, for deriving therefrom a unidirectional output whose amplitude and sense are functions of the magnitude and sense of any deviation of the frequency of said intermediate-frequency wave from a predetermined frequency; and means, receptive of said unidirectional output and coupled to said means for locally generating said carrier wave, for controlling the frequency of said last-named sideband wave whereby the frequency of said intermediate-frequency wave always corresponds to said predetermined frequency.

14. In a terminal station for a radio communication system: means for locally generating a carrier wave; means, receptive of said locally-generated carrier wave, for modulating the same to produce upper and lower sideband waves; a cavity resonator, tuned to the frequency of one of said sideband waves and adapted to transmit therethrough a portion of said one of said sideband waves; means for receiving a remotely-generated, frequency-stabilized carrier wave; means, receptive of said resonator-transmitted sideband wave and said remotely-generated, frequency-modulated carrier wave, for combining the same to produce a frequency-modulated, intermediate-frequency wave whose mean frequency is an arithmetic function of the frequencies of said last-named sideband wave and the mean frequency of said remotely-generated carrier wave; means, receptive of said intermediate-frequency wave, for deriving therefrom a unidirectional output whose amplitude and sense are functions of the magnitude and sense of any deviation of the frequency of said intermediate-frequency wave from a predetermined frequency; and means, receptive of said unidirectional output and coupled to said means for locally generating said carrier wave and said cavity resonator, for tuning said carrier wave generator and said cavity resonator whereby said resonator-transmitted sideband wave is such that the frequency of said intermediate-frequency wave always corresponds to said predetermined frequency.

GEORGE G. BRUCK.
ROBERT M. SPRAGUE.
MALCOLM C. VOSBURGH.

REFERENCES CITED

The following references are of record in the file of this patent:

UNITED STATES PATENTS

| Number | Name | Date |
|---|---|---|
| Re. 21,955 | Chaffee | Nov. 25, 1941 |
| 1,921,168 | Royden | Aug. 8, 1933 |
| 2,114,036 | Smith et al. | Apr. 12, 1938 |
| 2,289,444 | Mayr | July 14, 1942 |
| 2,317,547 | McRae | Apr. 27, 1943 |
| 2,379,395 | Ziegler et al. | June 26, 1945 |
| 2,380,288 | Bligh et al. | July 10, 1945 |
| 2,402,606 | Davis | June 25, 1946 |
| 2,408,791 | Magnuski | Oct. 8, 1946 |
| 2,419,527 | Bartelink | Apr. 29, 1947 |
| 2,424,796 | Carlson | July 29, 1947 |

Certificate of Correction

Patent No. 2,510,461 June 6, 1950

GEORGE G. BRUCK ET AL.

It is hereby certified that errors appear in the printed specification of the above numbered patent requiring correction as follows:

Column 3, line 33, for "intermediate-freqnency" read *intermediate-frequency*; line 40, for the words "station slave" read *slave station*; column 8, line 9, strike out "waves, and whose phase may be considered posi-" and insert instead *wave whose frequency corresponds to the dif-*; column 10, line 10, after "means" insert a comma; column 11, line 59, for "carried" read *carrier*; line 73, for "$(\Gamma-1)$" read $(\Gamma_c-1)$; column 16, line 68, for "$\Gamma_c$", first occurrence, read $\Gamma_0$; column 17, line 21, after "means" insert a comma; lines 50 and 51, for "remotely generated" read *remotely-generated*; line 53, after the syllable "ulated" strike out the period and insert instead a comma;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*